Nov. 11, 1952 — L. M. CHATTLER — 2,617,258
SOLENOID SHUTOFF VALVE WITH INTEGRAL HYDRAULIC TIME DELAY
Filed Sept. 13, 1950
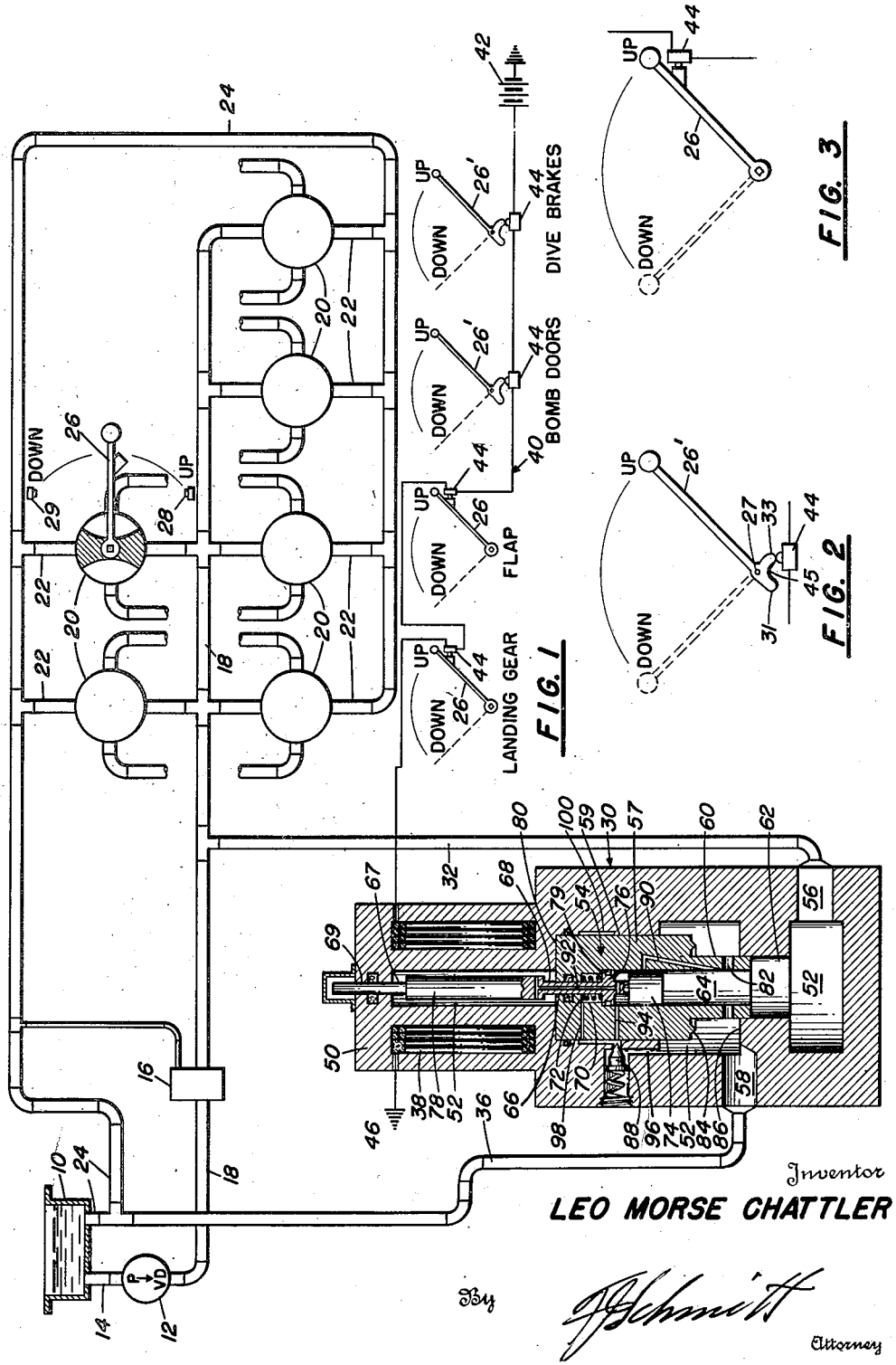
Inventor
LEO MORSE CHATTLER Patented Nov. 11, 1952

2,617,258

UNITED STATES PATENT OFFICE 2,617,258

SOLENOID SHUTOFF VALVE WITH INTEGRAL HYDRAULIC TIME DELAY

Leo M. Chattler, Washington, D. C.

Application September 13, 1950, Serial No. 184,653

4 Claims. (Cl. 60—52)

(Granted under the act of March 3, 1883, as amended April 30, 1928; 370 O. G. 757)

This invention relates to hydraulic systems for functional control of aircraft devices and the like. In particular the invention relates to a type of solenoid operated shut-off valve which has an adjustable time delay action, as a functional component in such systems.

Conventional hydraulic systems for the operation and control of various functions in aircraft such as raising and lowering of the landing gear, raising and lowering the wing flaps, opening and closing the bomb doors, operating the dive brakes, raising and lowering the arresting gear and folding and unfolding the wings and the like, comprise a system of closed center four port control valves arranged in parallel for single or multiple operational control of these functions, for delivering the fluid from the reservoir to the said control valves and generally a relief valve to open when the pressure on the hydraulic fluid exceeds a predetermined maximum and return a part of the fluid to the return line to the reservoir. Such systems are under high pressure at all times and are subject to excessive wear and tear because of this continual high pressure. Other disadvantages of the conventional system are:

a. Fire hazard is accentuated because of this high pressure.

b. The reliability of operation of the system is low because the system pressure is constantly trying to penetrate joints, fittings and valve attachments.

c. Equipment is more costly because internal leakage can not be allowed with the resulting smaller manufacturing tolerances.

d. Packing life is relatively short because the seals are constantly being subjected to high internal pressure and thus age hardened and given a permanent set as a result of being continuously distorted.

This inventor has found that this continual high pressure on the system when none of the functions are being operated may be greatly reduced by passing all of the hydraulic fluid from the high pressure side of the pump back to the reservoir. He accomplishes this effect by the installation of a solenoid operated shut-off valve in the high pressure line from the pump to the control valves and in parallel with those valves. When this solenoid operated valve is open the hydraulic fluid in the system passes therethrough and back to the reservoir thereby reducing the pressure on the system to a relatively low magnitude. The structure and method of operation of this valve constitutes the essence of this invention.

In order that a clearer understanding may be had of this invention reference is now made to the drawing which is merely illustrative of a preferred arrangement of the solenoid operated valve in a conventional four port closed center valve system in which the control valves are arranged for functional operation and wherein:

Figure 1 is a diagrammatic plan of a conventional four port, closed center control valve hydraulic system showing in sectional view the subject solenoid operated cut-off valve and its relationship to the hydraulic system and Figs. 2 and 3 are elevational views, diagrammatic in character showing the structural relationship of the micro-switches in the solenoid electric circuit to the operative control levers of the control valves.

Referring further to the drawing the hydraulic system is shown as comprising a reservoir 10 for the hydraulic fluid, a variable delivery pump 12 connected on its suction side to reservoir 10 by conduit 14, a relief valve 16 connected in delivery line 18 from pump 12, a plurality of closed center four way control valves 20 connected in parallel to delivery line 18 for controlling the operation of various functions of aircraft devices, such as enumerated in the second paragraph supra, return conduits 22 from each control valve feeding into main return line 24 back to reservoir 10, and solenoid operated time delay shut-off valve 30 connected by conduit 32 to delivery line 18 and to return line 24 by conduit 36.

Solenoid coil 38 in shut off valve 30 is energized by electrical circuit shown generally at 40 which comprises a source of electrical energy 42, a plurality of micro-switches 44 which are operated by handles 26 of control valve 20 and are connected in series to solenoid coil 38. The latter is grounded as at 46. As here indicated valves 20 are provided with manual operating handles 26, 26' which may be rotated to either stops 28 or 29 to direct the flow of hydraulic fluid therethrough as desired and at the same time closing or opening the electric circuit through the micro-switches as the case may be.

In those systems where electrically operated control valves are used in lieu of manually operated valves shown at 20 the micro-switches may be dispensed with and the solenoid operated shut-off valve circuit so connected into the electric operated control valve circuit as to give the same action as will be hereafter described.

As described above the system is essentially a closed center system utilizing a variable delivery pump in lieu of a pressure regulator and accumulator and contains all of the components of the existing type of system with the exception of one solenoid operated hydraulic time delay shut-off valve. The purpose of the solenoid operated shut-off valve is to dump the system pressure automatically by application of an electrical signal during flight when no hydraulic services are required.

Fluid is drawn from the reservoir into the the main system. Normal system delivery requirements are controlled by the variable delivery pump. The solenoid operated shut-off valve is connected between the pressure delivery line of the dump and the main return line to the reservoir. As above indicated micro-switches 44 are operated by the various control levers 26, 26'. An electrical connection is made through the micro-switches in series to the solenoid of the shut-off valve. When all of the control handles contact the micro-switches, the circuit is completed and the solenoid shut-off valve receives energy for opening. However, the opening is delayed by a predetermined time, which is set by adjusting the orifice screw in the valve body (described hereinafter), to meet the maximum time requirement of any operating circuit. After the predetermined time has elapsed, the solenoid valve opens and by-passes the pump capacity to the reservoir dumping the system pressure. When any hydraulic subsystem is operated, the electrical series circuit is interrupted or maintained open and the solenoid shut-off valve closes, thereby directing the pump capacity into the system. In the operation of the bomb doors or dive brakes, wherein the circuit is broken during the traverse of the control handle and remade at the end of travel of said handle (see Figure 2 of the drawing), the solenoid is deenergized during the travel of the control handle because the electrical series circuit is broken, the shut-off valve instantly closes and upon re-energization of the solenoid, due to closing of the circuit, the shut-off valve reopens after the predetermined time lag has elapsed. Furthermore, in the event of any failure of the electrical components or circuit, the solenoid valve closes and the system operates as a normally closed center variable delivery pump system until the electrical difficulty is corrected.

Referring further to Figures 2 and 3 of the drawing, in Figure 2 is shown diagrammatically the arrangement of the microswitch 44 and control valve lever 26' for the operation of bomb doors and dive brakes as indicated in Figure 1. Levers 26' pivot or fulcrum at 27 on the valve stems and the leg extending beyond this fulcrum is provided at its extremity with a two lobe cam as at 31 and 33. These lobes at the "up" or "down" position of the control lever bear down on the push button of micro-switch 44 thereby closing the electrical circuit 40 with the operative effect on the shut-off valve above described. In between these two operative positions of lever 26' a concave portion 45 of the cam is over the push button of the microswitch 44 in which position the electrical circuit is open and the shut-off valve immediately moves to closed position. When lobe 31 bears on the push button of the microswitch the solenoid of the shut-off valve is reenergized and the valve moves to open position as above described.

Figure 3 illustrates diagrammatically the positioning of the micro-switches with respect to valve levers 26 in the other functional operations of the system. In these cases also the electrical circuit is closed only when the control levers are in the "up" positions. The operative effect is that when any control lever 26 is in the "down" position the shut-off valve is immediately closed and hydraulic fluid is fed through that control valve at high pressure and is maintained under high pressure by the shut-off valve until the electrical circuit is again closed.

With reference to solenoid operated shut-off valve 30 structurally this valve may comprise a cylindrical valve body having a reduced end portion 50. This valve body is provided therein with an axially extending chamber 52 which is of different diameters at different sections of the valve body thereby providing shoulders or abutments and bearings for the limiting of the reciprocating movement of slide valve 54 which is positioned within this chamber. The valve body is provided with an inlet port 56 and also with outlet port 58 both ports communicating with chamber 52. Slide valve 54 is a cylindrical body having an enlarged portion 57 adapted to slidably engage portion 59 of chamber 52 relatively closely, and a reduced portion 60 adapted to slidably engage reduced portion 62 of chamber 52 to be guided thereby as said slide valve reciprocates in chamber 52. Slide valve 54 is provided therein with an axially extending bore 64 the portions of which are of different diameters to provide a bearing at 66 for spool 68 and a housing 70 for spring 72. Spool 68 is slidable in bearing 66 and extends into the larger portion of bore 64. At its end within this portion it is provided with a piston 74. Spaced from piston 74 and forming a chamber therebetween is a second piston 76 on which spring 72 is biased. Both pistons 74 and 76 are securely attached to spool 68 and make relatively close sliding contacts with the surrounding walls of bore 64. On the outer portion of spool 68 and extending into the magnetic field of coil 38 is armature 78. When coil 38 is energized armature 78 which is hydraulically balanced by the extension of spool 68 through valve body 30 as at 67 and 69, is drawn up into the magnetic field thereof until piston 76 strikes shoulder 79. When coil 38 is deenergized spring 72 moves spool 68 downwardly until the lower face of armature 78 strikes the top face 80 of slide valve 54. Slide valve 54 in its lower part is provided with ports 82 which extend through the wall thereof. When the slide valve is in open position hydraulic fluid passes from bore 64 through ports 82, into surrounding chamber 52, through outlet port 58 and into return lines 36 and 24 to the reservoir thereby "dumping" the pressure existing on the hydraulic fluid in the system. When the slide valve is in closed position, for example, when it moves down until shoulder 84 strikes shoulder 86 and seals thereby preventing communication between adjacent compartments in chamber 52, ports 82 are covered by the face of the wall of reduced portion 62 of chamber 52 and flow of hydraulic fluid to the return line to the reservoir is cut off and the entire pump delivery is directed into the system under high pressure. In moving from closed to open position the action of slide valve 54 is delayed or retarded a length of time equal to the maximum time required for the operation of any of the functional operations under the control of control valves 20. This delayed action is brought about by the flow of the hydraulic fluid through spring biased needle valve 88 being exhausted from the space above the slide valve.

Slide valve 54 is provided with a channel 90 which communicates with bore 64 at a point below piston 74 and with the space between pistons 74 and 76 when spool 68 is in its extreme downward position relative to the slide valve. When spool 68 is in its extreme upper position relative thereto the discharge port of channel 90 is covered by piston 74 and flow of hydraulic fluid therethrough is cut off. When the slide valve moves from open to closed position hydraulic fluid passes through channel 90 into the space between pistons 74 and 76 through channel 92 and into the space above slide valve 54. This movement of slide valve 54 is relatively rapid since there is very little restriction to the flow of the hydraulic fluid through these channels and the pressure output of the pump applies a large closing force. When slide valve 54 moves from closed to open position, for example, when solenoid coil 38 is energized, movement of the slide valve is retarded by the reverse flow of the hydraulic fluid from above the slide valve through channels 92, 94, spring biased bleed valve 88, channel 96 to chamber 52 and via port 58 to return line 36 to the reservoir. In this movement of slide valve 54 any hydraulic fluid in the space around spring 72 above piston 76 is forced therefrom through channel 98 into annular groove 100 in the wall chamber 52 and thence out through spring biased needle valve 88 along with the hydraulic fluid coming through channel 94. This efflux of hydraulic fluid from within housing 70 permits the seating of piston 76 on shoulder 79 thereby limiting the upward travel of spool 68 relative to the slide valve.

The operation of shut-off valve 30 has been defined in the above structural description. The said operation is completely automatic and broadly consists in the movement of slide valve 54 therein contained from open to closed position and vice versa. The movement of the slide valve from open to closed positions occurs relatively rapidly when the solenoid coil 38 is deenergized. As stated above the hydraulic fluid passes from bore 64 through channels 90 and 92 into the space above slide valve 54 thereby forcing the latter downwardly to closed position. There is little restriction to the flow of hydraulic fluid through these channels and the movement of the slide valve to closed position is relatively rapid. But the movement of the slide valve from closed to open position is retarded by the flow of hydraulic fluid from above the slide valve through a spring biased needle valve as above described. Spring pressure on this needle valve is regulated so that the time of flow of the hydraulic fluid therethrough is slightly more than the maximum time required for the operation of any of the functional apparatus of the aircraft.

While this inventor has described and shown a particular exemplification of a solenoid operated shut-off valve he does not desire to be strictly limited to the structural details disclosed, beyond that set forth in the hereto appended claims, since obvious changes in the relation of ports, the positioning of the flow channels, etc., could be made by one skilled in the art without effecting the operation of the valve and without departing from the the spirit and scope of the invention as defined by said claims.

The invention described herein may be manufactured and used by or for the Government of the United States of America for governmental purposes without the payment of any royalties thereon or therefor.

I claim:

1. In a high pressure hydraulic system for operational control of a plurality of functional devices, said system including a reservoir for hydraulic fluid, hydraulic fluid in said reservoir, a variable delivery pump, a plurality of control valves, an operating handle connected to the valve stem of each control valve, said control valves arranged in parallel in said system for single and multiple operation, conduits interconnecting the reservoir with the pump and the latter to said control valves and the return from said control valves to said reservoir, a solenoid operated shut-off valve connected in parallel with said control valves in said system for reducing the hydraulic pressure on the system to a relatively low magnitude automatically when said shut off is in open position and for directing, when in closed position, said hydraulic fluid under relatively high pressure to said control valves, and electric circuit means responsive to the positioning of each of said operating handles on said control valves for energizing and deenergizing the solenoid in said shut off valve to move the latter to open and closed positions respectively.

2. The electric circuit means as defined in claim 1 comprising a source of electric energy, a plurality of electrical switches each one of which is operatively connected to one of said control valve operating handles to be thrown into open and closed contact thereby, all of said switches being connected in series with the source of electrical energy and the solenoid of said shut off valve whereby when all of the switches are closed said solenoid is energized and said shut off valve is moved to open position and when at lease one of said switches is open the said solenoid is deenergized and said shut off valve is moved to closed position.

3. The solenoid operated shut off valve as defined in claim 1 and characterized by a time delay in the opening cycle and quick action in the closing cycle comprising a valve body, a chamber within said valve body extending axially thereof, said chamber being of different diameters along its axis thereby providing compartments therein, inlet and outlet ports in said valve body communicating with compartments in said chamber, a solenoid coil mounted within and at one end of said valve body and around one compartment of reduced diameter of said chamber, a slide valve positioned within another compartment of said chamber in relatively close contact with the sidewalls thereof and adapted to be reciprocated therein, a longitudinal bore extending axially of said slide valve, said bore being of uniform diameter from one end of said slide valve to a point near the other end of said slide valve, said bore being of a reduced diameter from said point to a point nearer the said other end of said slide valve to provide a shoulder in said bore and a housing for a coiled spring, said bore being of a further reduced diameter from said nearer point to the outside face of said slide valve, a spool, slidably mounted in said further reduced diameter section of said bore extending from outside said slide valve to a point within the section of said bore of largest diameter, a piston mounted on said spool at the end thereof within said bore and in relatively close contact with the sidewalls of this section of said bore, a second piston mounted on said spool in spaced relationship to said first piston in relatively close contact with the sidewalls of said bore and forming a compartment between said the two pistons, an armature of larger diameter than said spool, on the outer portion thereof, extending into said one compartment of said chamber and into the magnetic field of said solenoid coil, a coiled spring mounted on said spool within said housing section and exerting a biasing pressure on said second piston, a plurality of ports in the lower part of said slide valve communicating with said bore and with a compartment in said chamber when said slide valve is in open position to permit the flow of hydraulic fluid therethrough to the return line to the reservoir, said ports covered by the side walls of said chamber when said slide valve is in closed position and flow of hydraulic fluid therethrough to the reservoir being thereby cut off, a channel in the wall of said slide valve communicating, when said slide valve is in closed position, with the bore below said first piston and with said compartment between the two pistons when said spring is extended, for the passage of hydraulic fluid from the bore below said first piston into said compartment, a channel in said spool for the passage of hydraulic fluid from said compartment between said pistons to the space above said slide valve and vice versa, a relatively wide annular groove in the sidewall of the chamber in said valve body, a second channel in the wall of said slide valve in communication with the compartment between said pistons and said annular groove as said slide valve moves from closed to open position to pass the hydraulic fluid from said compartment into said annular groove, a third channel in the wall of slide valve in communication with said housing space above said second piston and said annular groove to pass hydraulic fluid from said housing space into said annular groove and vice versa as said spool and pistons are relatively moved by said solenoid to valve open position and by said spring to valve closed position, a spring biased needle valve seated in a discharge port from said annular groove, a fourth channel in the wall of said valve body between said needle valve and an enlarged compartment in the chamber in said valve body communicating with the outlet port of said body and an adjusting screw in threaded engagement with valve body and bearing on the spring biasing said needle valve whereby the pressure exerted by said spring on said needle valve may be varied, the rate of flow of hydraulic fluid through said needle valve may be regulated and the consequent movement of said slide valve from closed to open position may be set at a desired rate.

4. In a high pressure hydraulic system for operational control of a plurality of functional devices, a reservoir for hydraulic fluid, a variable delivery pump, a plurality of control valves arranged in parallel in said system for single and multiple operation, conduits interconnecting the reservoir to the pump and the latter to said control valves and the return from said control valves to said reservoir, a shut-off valve connected in parallel with said control valves in said system for reducing the hydraulic pressure on the system to a relatively low magnitude automatically when said shut-off valve is in open position and for directing when in closed position said hydraulic fluid under high hydraulic pressure in said control valves, a power device for actuating said shut-off valve, power elements connected to each of said control valves and movable to open and closed positions, and a power line including in series each of said valve power elements operative when said power elements are closed to energize said power device to open said shut-off valve and when any one of said power elements are open to permit closure of said shut-off valve.

LEO M. CHATTLER.

REFERENCES CITED

The following references are of record in the file of this patent:

UNITED STATES PATENTS

| Number | Name | Date |
| --- | --- | --- |
| 1,904,112 | Achard | Apr. 18, 1933 |
| 1,968,422 | Proctor et al. | July 31, 1934 |
| 2,311,864 | Parsons | Feb. 23, 1943 |

FOREIGN PATENTS

| Number | Country | Date |
| --- | --- | --- |
| 479,717 | Germany | July 22, 1929 |